United States Patent
Takeuchi (10) Patent No.: US 9,297,292 B2
(45) Date of Patent: Mar. 29, 2016

(54) ENGINE COOLING DEVICE (75) Inventor: Nobutaka Takeuchi, Miyoshi (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 45 days.

(21) Appl. No.: 13/881,902

(22) PCT Filed: Jul. 20, 2011

(86) PCT No.: PCT/JP2011/066425
§ 371 (c)(1),
(2), (4) Date: Apr. 26, 2013

(87) PCT Pub. No.: WO2013/011573
PCT Pub. Date: Jan. 24, 2013

(65) Prior Publication Data
US 2013/0213322 A1    Aug. 22, 2013

(51) Int. Cl.
| | |
|---|---|
| *F01P 9/00* | (2006.01) |
| *F01P 7/02* | (2006.01) |
| *F01P 7/14* | (2006.01) |
| *F01P 3/00* | (2006.01) |
| *F01P 3/02* | (2006.01) |
| *F01P 7/16* | (2006.01) |
| *F01N 5/02* | (2006.01) |
| *F02D 41/14* | (2006.01) |

(52) U.S. Cl.
CPC ... *F01P 3/00* (2013.01); *F01N 5/02* (2013.01); *F01P 3/02* (2013.01); *F01P 7/165* (2013.01); *F01N 2240/02* (2013.01); *F01N 2560/025* (2013.01); *F01N 2560/06* (2013.01); *F01P 7/162* (2013.01); *F01P 7/164* (2013.01); *F01P 2003/027* (2013.01); *F01P 2007/146* (2013.01); *F01P 2025/44* (2013.01); *F01P 2037/02* (2013.01); *F01P 2060/18* (2013.01); *F02D 41/1494* (2013.01)

(58) Field of Classification Search
USPC .............. 123/41.05, 41.08, 41.09, 41.29
See application file for complete search history.

(56) References Cited

U.S. PATENT DOCUMENTS

| 3,486,488 | A | * | 12/1969 | Frings | 123/41.01 |
| 5,901,553 | A | * | 5/1999 | Cullen | 60/274 |
| 7,246,487 | B2 | * | 7/2007 | Hara | 60/298 |
| 7,267,084 | B2 | * | 9/2007 | Lutze et al. | 123/41.02 |
| 8,000,883 | B2 | | 8/2011 | Iwahashi et al. | |

(Continued)

FOREIGN PATENT DOCUMENTS

| DE | 3937314 A1 | 5/1990 |
| DE | 10 2009 029 320 A1 | 4/2010 |

(Continued)

*Primary Examiner* — Marguerite McMahon
*Assistant Examiner* — Tea Holbrook
(74) *Attorney, Agent, or Firm* — Kenyon & Kenyon LLP (57) ABSTRACT

An engine cooling device including a water pump, a radiator, an exhaust heat recovery unit, and a coolant circulation circuit for circulating a coolant in these apparatuses includes a flow rate limiting means that limits the flow rate of the coolant that circulates in the exhaust heat recovery unit in the case where a temperature of a sensor element of an A/F sensor, that is disposed downstream of the exhaust heat recovery unit in an exhaust path, is below a preset activation temperature. An extent of opening of a second switching valve is made smaller in the case where the temperature of the sensor element is below the activation temperature than in the case where the temperature is equal to or higher than the activation temperature.

4 Claims, 5 Drawing Sheets

(56) References Cited

U.S. PATENT DOCUMENTS

| | | | |
|---|---|---|---|
| 2001/0011455 A1* | 8/2001 | Harima et al. | 60/288 |
| 2006/0157002 A1* | 7/2006 | Pfeffinger et al. | 123/41.29 |
| 2007/0297486 A1* | 12/2007 | Landis et al. | 374/185 |
| 2008/0115487 A1* | 5/2008 | Harada et al. | 60/320 |
| 2009/0050480 A1* | 2/2009 | Arceneaux | G01N 27/4067 204/424 |
| 2009/0229543 A1* | 9/2009 | Suzuki | 123/41.02 |
| 2009/0308059 A1* | 12/2009 | Ikemoto | F01N 3/043 60/287 |
| 2011/0083426 A1* | 4/2011 | Ikemoto | F01N 3/043 60/286 |
| 2011/0197853 A1* | 8/2011 | Takeishi et al. | 123/406.45 |
| 2012/0199084 A1* | 8/2012 | Kinomura | F01P 7/165 123/41.08 |
| 2013/0213600 A1* | 8/2013 | Saitoh | 165/11.1 |

FOREIGN PATENT DOCUMENTS

| | | |
|---|---|---|
| EP | 1621805 A1 | 2/2006 |
| EP | 2088295 A2 | 8/2009 |
| FR | 2932845 A1 | 12/2009 |
| JP | 2007046469 A | 2/2007 |
| JP | 2007-315855 A | 12/2007 |
| JP | 2009-150266 A | 7/2009 |
| JP | 2009-156052 A | 7/2009 |
| JP | 2010-090828 A | 4/2010 |

* cited by examiner

ENGINE COOLING DEVICE

This is a 371 national phase application of PCT/JP2011/066425 filed 20 Jul. 2011, the content of which is incorporated herein by reference.

FIELD OF THE INVENTION

The present invention relates to an engine cooling device.

BACKGROUND OF THE INVENTION

In an engine (internal combustion engine) mounted in a vehicle or the like, water jackets are each formed in a cylinder head and a cylinder block as coolant paths, and a coolant is circulated in the respective water jackets of the cylinder head and the cylinder block by a water pump. As such an engine cooling device, known is a device in which an exhaust heat recovery unit is disposed in a coolant path (bypass path) that bypasses the respective water jackets of the cylinder head and the cylinder block, and during engine warm-up, no coolant is circulated in the respective water jackets of the cylinder head and the cylinder block, and the coolant is circulated only in the bypass path (for example, see Patent Literature 1). The exhaust heat recovery unit is provided in, for example, the exhaust system of the engine, and is configured so as to be capable of carrying out heat exchange between the exhaust gas flowing in the exhaust path and the coolant flowing in the coolant path.

Also, air-fuel ratio feedback control is carried out in the engine based on the output of an exhaust gas sensor (for example, A/F sensor, $O_2$ sensor, or the like) disposed in the exhaust path (for example, see Patent Literature 2). In order to stably carry out the air-fuel ratio feedback control, the exhaust gas sensor needs to be in an activated state by being sufficiently heated by the heat of the exhaust gas, and specifically, the temperature of the exhaust gas sensor (the temperature of a sensor element) needs to be equal to or higher than a predetermined activation temperature (for example, see Patent Literature 2 and 3). Patent Literature 3 states that when the temperature of the exhaust path is low, the sensor element of the exhaust gas sensor is heated by a heating means.

CITATION LIST

Patent Literature

[PTL 1] JP 2009-150266A
[PTL 2] JP 2009-156052A
[PTL 3] JP 2007-315855A
[PTL 4] JP 2010-090828A

DISCLOSURE OF INVENTION

Technical Problems

Meanwhile, with the engine cooling device described in Patent Literature 1, because the coolant always circulates in the exhaust heat recovery unit, there is a concern about the following problem. In the case where the exhaust gas sensor as described above is disposed downstream of the exhaust heat recovery unit in the exhaust path, the exhaust gas whose temperature has been decreased by heat exchange in the exhaust heat recovery unit comes in contact with the exhaust gas sensor. Accordingly, during the cold start of the engine or in a similar instance, activation of the exhaust gas sensor is delayed, resulting in a problem in that no air-fuel ratio feedback can be carried out when the temperature of the exhaust gas sensor is below the activation temperature.

The present invention has been achieved in view of such a problem, and an object is to provide an engine cooling device capable of promptly activating an exhaust gas sensor disposed downstream of an exhaust heat recovery unit in the exhaust path.

SUMMARY OF THE INVENTION

Means for Solving the Problems

In the present invention, a means for solving the above-described problem is configured as follows. That is, the present invention is an engine cooling device including a water pump, a radiator, an exhaust heat recovery unit, and a coolant circulation circuit for circulating a coolant in these apparatuses, the engine cooling device including a flow rate limiting means that limits a flow rate of the coolant that circulates in the exhaust heat recovery unit in a case where a temperature of a sensor element of an exhaust gas sensor that is disposed downstream of the exhaust heat recovery unit in an exhaust path is below a preset activation temperature.

According to the foregoing configuration, in the case where the temperature of the sensor element of the exhaust gas sensor is below the activation temperature, the flow rate of the coolant that circulates in the exhaust heat recovery unit is limited by the flow rate limiting means, and the exhaust heat recovery operation by the exhaust heat recovery unit is limited. Therefore, in the exhaust heat recovery unit, heat exchange between the exhaust gas flowing in the exhaust path of the engine and the coolant flowing into the exhaust heat recovery unit is limited, and therefore the temperature decrease of the exhaust gas resulting from the exhaust heat recovery operation in the exhaust heat recovery unit is suppressed. It is thus possible to promptly activate the exhaust gas sensor provided downstream of the exhaust heat recovery unit in the exhaust path. That is, it is possible to promptly raise the temperature of the sensor element of the exhaust gas sensor and reach the activation temperature. Then, it is possible to carry out air-fuel ratio feedback control that is based on the output of the exhaust gas sensor soon after engine start-up.

In the present invention, it is preferable that the flow rate limiting means is a valve that is capable of regulating the flow rate of the coolant that circulates in the exhaust heat recovery unit, and makes an extent of opening of the valve smaller in a case where the temperature of the sensor element is below the activation temperature than in a case where the temperature is equal to or higher than the activation temperature.

According to the foregoing configuration, in the case where the temperature of the sensor element of the exhaust gas sensor is below the activation temperature, the flow rate of the coolant that circulates in the exhaust heat recovery unit is limited by making the extent of opening of the valve small, and thus the exhaust heat recovery operation by the exhaust heat recovery unit is limited. Accordingly, a decrease of the temperature of the exhaust gas resulting from the exhaust heat recovery operation in the exhaust heat recovery unit is suppressed, thus making it possible to promptly activate the exhaust gas sensor provided downstream of the exhaust heat recovery unit in the exhaust path.

In the present invention, it is preferable that the flow rate limiting means is a water pump that is capable of regulating the flow rate of the coolant that circulates in the exhaust heat recovery unit, and makes the amount of discharge of the water pump smaller in a case where the temperature of the sensor element is below the activation temperature than in a case where the temperature is equal to or higher than the activation temperature.

According to the foregoing configuration, in the case where the temperature of the sensor element of the exhaust gas sensor is below the activation temperature, the amount of discharge of the water pump is made small, thus limiting the flow rate of the coolant that circulates in the exhaust heat recovery unit, and limiting the exhaust heat recovery operation performed by the exhaust heat recovery unit. Accordingly, a decrease of the temperature of the exhaust gas resulting from the exhaust heat recovery operation in the exhaust heat recovery unit is suppressed, thus making it possible to promptly activate the exhaust gas sensor provided downstream of the exhaust heat recovery unit in the exhaust path.

In the present invention, it is preferable that the exhaust heat recovery unit is disposed in a bypass path that bypasses a coolant path provided inside the engine.

According to the foregoing configuration, cooling (or warm-up) of the engine and the exhaust heat recovery operation by the exhaust heat recovery unit can be carried out independently. For example, even when limitation on the flow rate of the coolant into the exhaust heat recovery unit is lifted, it is possible to limit the flow rate of the coolant into the engine, and it is possible to facilitate engine warm-up while carrying out the exhaust heat recovery operation by the exhaust heat recovery unit.

In the present invention, it is preferable that coolant paths are each provided inside a cylinder block and a cylinder head of the engine and the coolant paths are disposed in parallel. In this case, it is preferable that a supply of the coolant to the coolant path of the cylinder block is stopped when the engine is cold.

According to the foregoing configuration, it is possible to facilitate cylinder block warm-up while cooling the cylinder head since a supply of the coolant to the coolant path of the cylinder block is stopped when the engine is cold.

In the present invention, it is preferable that the flow rate limiting means stops a supply of the coolant to the exhaust heat recovery unit in a case where the temperature of the sensor element is below the activation temperature.

According to the foregoing configuration, a decrease of the temperature of the exhaust gas resulting from the exhaust heat recovery operation in the exhaust heat recovery unit is suppressed, thus making it possible to facilitate the activation of the exhaust gas sensor provided downstream of the exhaust heat recovery unit in the exhaust path.

Effects of the Invention

According to the present invention, in the case where the temperature of the sensor element of the exhaust gas sensor is below the activation temperature, the flow rate of the coolant that circulates in the exhaust heat recovery unit is limited by the flow rate limiting means, and the exhaust heat recovery operation by the exhaust heat recovery unit is limited. Therefore, in the exhaust heat recovery unit, heat exchange between the exhaust gas that flows in the exhaust path of the engine and the coolant that flows into the exhaust heat recovery unit is limited, and thus a decrease of the temperature of the exhaust gas resulting from the exhaust heat recovery operation in the exhaust heat recovery unit is suppressed. This makes it possible to complete at an early stage the activation of the exhaust gas sensor provided downstream of the exhaust heat recovery unit in the exhaust path. That is, it is possible to promptly raise the temperature of the sensor element of the exhaust gas sensor to reach the activation temperature.

DETAILED DESCRIPTION

A specific embodiment of the present invention will now be described with reference to the attached drawings.

Below, an example in which the present invention is applied to an engine cooling device mounted in a vehicle such as an automobile is described.

Figure 1:
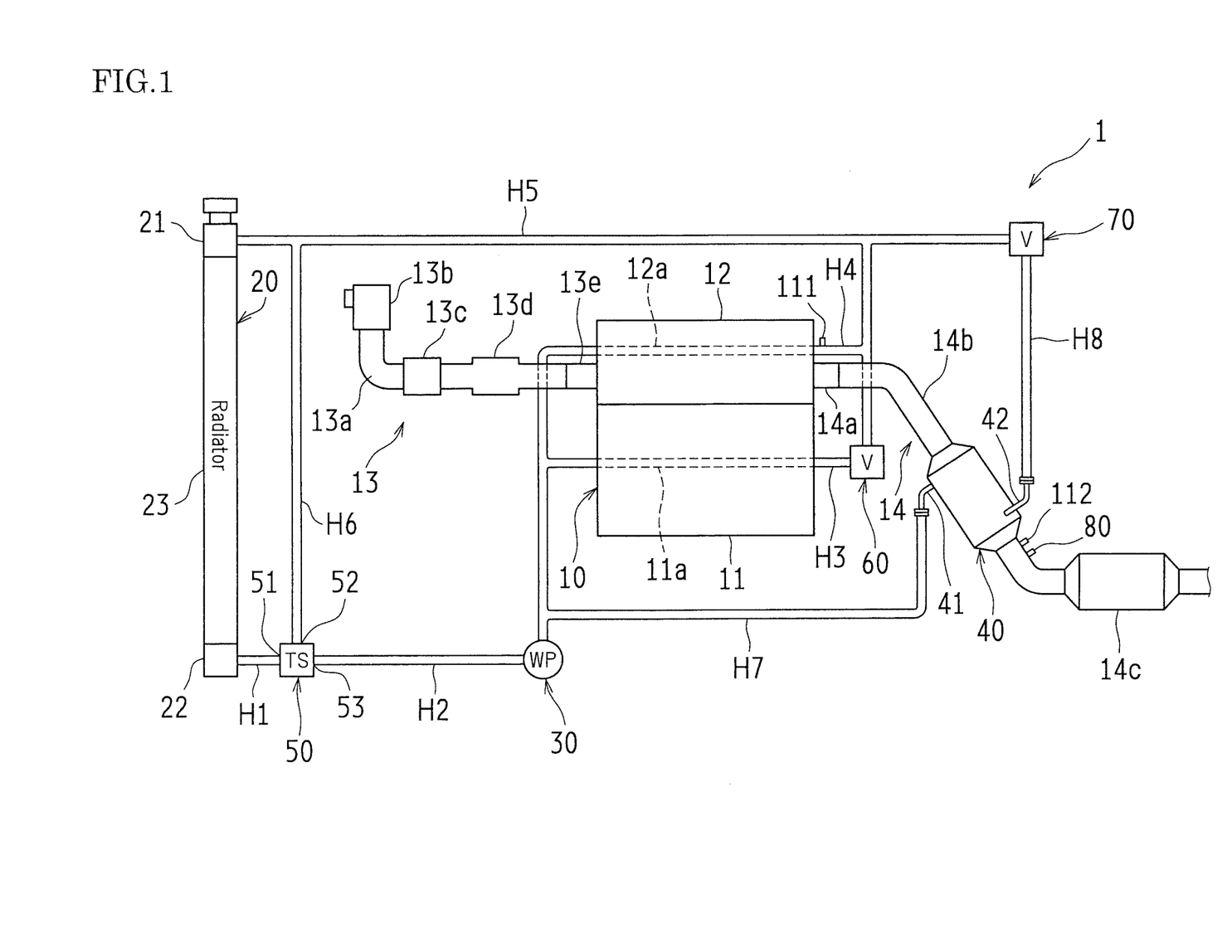
FIG. 1 is a schematic diagram showing an engine cooling device and an intake and exhaust system of an engine according to an embodiment.

FIG. 1 is a schematic diagram showing an engine cooling device and an intake and exhaust system of an engine according to an embodiment.

The engine cooling device according to an embodiment includes a coolant circulation circuit 1 for cooling an engine 10 as shown in FIG. 1. The coolant circulation circuit 1 includes, for example, a radiator 20, a water pump 30, an exhaust heat recovery unit 40, and pipes H1 to H8 that connect each of these apparatuses. Also, the coolant circulation circuit 1 includes a thermostat 50 and first and second switching valves 60, 70 for switching coolant circulation paths and changing the flow rate of the coolant.

In the coolant circulation circuit 1, a lower tank 22 of the radiator 20 and a first inlet port 51 of the thermostat 50 are connected by a lower pipe H1. An outlet port 53 of the thermostat 50 and the suction port of the water pump 30 are connected by a pump suction pipe H2.

The discharge port of the water pump 30 is in communication with both water jackets 11*a*, 12*a* of the engine 10. Specifically, the block-side water jacket 11*a* is formed inside a cylinder block 11 of the engine 10, and a head-side water jacket 12*a* is formed inside a cylinder head 12 of the engine 10. The block-side water jacket 11*a* and the head-side water jacket 12*a* are disposed in parallel. The coolant discharged by the water pump 30 is directly introduced into both the block-side water jacket 11*a* and the head-side water jacket 12*a*.

The coolant that has traveled through the block-side water jacket 11*a* is extracted out of the cylinder block 11 by an extraction pipe H3. Also, the coolant that has traveled through the head-side water jacket 12*a* is extracted out of the cylinder head 12 by an extraction pipe H4. The downstream ends of the extraction pipes H3, H4 meet and are connected to an upper pipe H5. A first switching valve 60 is provided in the middle of the extraction pipe H3. Also, a water temperature sensor 111 that senses the temperature of the coolant that circulates in the coolant circulation circuit 1 is provided in the middle of the extraction pipe H4. In this case, the temperature of the coolant sensed by the water temperature sensor 111 is the temperature of the coolant that has flowed out of the head-side water jacket 12*a*.

The upper pipe H5 is connected to an upper tank 21 of the radiator 20. A bypass pipe H6 is connected in the middle of the upper pipe H5 so as to bypass the radiator 20. The downstream end of the bypass pipe H6 is connected to a second inlet port 52 of the thermostat 50.

Also, the discharge port of the water pump 30 and an introduction connecting pipe 41 provided at the introduction port of the exhaust heat recovery unit 40 are connected by an introduction pipe H7. The exhaust heat recovery unit 40 is disposed in parallel with the block-side water jacket 11a and the head-side water jacket 12a. That is, in the coolant circulation circuit 1, the exhaust heat recovery unit 40 is disposed in a bypass path that bypasses the block-side water jacket 11a and the head-side water jacket 12a, and the coolant discharged from the water pump 30 is directly introduced into the exhaust heat recovery unit 40. The coolant that has traveled inside the exhaust heat recovery unit 40 is discharged from a discharge connecting pipe 42 to a discharge pipe H8. The second switching valve 70 is provided in the middle of the discharge pipe H8. The downstream end of the discharge pipe H8 is connected to the middle of the upper pipe H5. In this case, the discharge pipe H8 is connected to a portion of the upper pipe H5 that is further upstream than the portion to which the bypass pipe H6 is connected.

Next, the apparatuses provided in the coolant circulation circuit 1 will now be described briefly.

The radiator 20 is of a downflow type, and a radiator core 23 is provided between the upper tank 21 and the lower tank 22. The coolant recovered from the engine 10 to the upper tank 21 via the upper pipe H5 undergoes heat exchange with outside air (such as traveling wind, air blown by driving a cooling fan) when flowing down inside the radiator core 23 toward the lower tank 22. This heat exchange dissipates heat to the outside air so as to cool the coolant.

The water pump 30 is a coolant circulation means for circulating the coolant in the coolant circulation circuit 1. In this embodiment, the water pump 30 is driven in response to the rotational driving force of the crankshaft, which is the output shaft of the engine 10. Accordingly, when the engine 10 is in operation, the water pump 30 is driven, and a coolant circulating operation is carried out in the coolant circulation circuit 1.

The exhaust heat recovery unit 40 carries out heat exchange between the exhaust gas that flows in the exhaust path of the engine 10 and the coolant that flows in from the introduction pipe H7, and discharges the heat-exchanged coolant from the discharge pipe H8. A heat exchanging part, which is not shown, is accommodated inside the exhaust heat recovery unit 40, and in this heat exchanging part, the exhaust gas and the coolant undergo heat exchange. A heat exchanging part in which a spiral pipe is accommodated may be usable as the foregoing heat exchanging part, with one end being in communication with the introduction connecting pipe 41 and the other end being in communication with the discharge connecting pipe 42. In this case, when the exhaust gas flows inside the exhaust heat recovery unit 40 via an exhaust pipe 14b as the engine 10 operates, the exhaust gas that flows outside the spiral pipe and the coolant that flows inside the spiral pipe undergo heat exchange. As a result, the temperature of the coolant that flows inside the spiral pipe is increased, and exhaust heat is recovered.

Note that exhaust gas whose temperature has been decreased due to heat exchange in the exhaust heat recovery unit 40 is released into the atmosphere after traveling through a catalyst 14c and a muffler, which is not shown. On the other hand, the coolant whose temperature has been increased due to heat exchange circulates in the coolant circulation circuit 1 via the discharge pipe H8, and exhaust heat recovered by the coolant is used for heating inside the cabin and for engine warm-up.

The thermostat 50 switches circulation paths of the coolant in the coolant circulation circuit 1 according to the temperature of the coolant. The thermostat 50 is configured such that, for example, a valve is operated by thermowax packed inside that expands/contracts according to the temperature of the coolant.

When the engine 10 is cold, or that is, in the case where the temperature of the coolant is relatively low, the thermostat 50 is switched to a state in which the first inlet port 51 is closed and the second inlet port 52 is opened. Accordingly, the flow of the coolant toward the water pump 30 from the lower tank 22 of the radiator 20 stops, and the coolant flows toward the water pump 30 from the bypass pipe H6. That is, a coolant circulation operation in which the radiator 20 is not used is carried out in the coolant circulation circuit 1, and thus an engine 10 warm-up operation is promptly completed.

On the other hand, after the completion of engine 10 warm-up, or that is, in the case where the temperature of the coolant is increased and the valve opening temperature of the thermostat 50 or a higher temperature is reached, the thermostat 50 is switched to a state in which the first and second inlet ports 51, 52 are both opened. Accordingly, part of the coolant in the upper pipe H5 circulates on the radiator 20 side. That is, the coolant flows toward the water pump 30 from the lower tank 22 of the radiator 20. In this way, a coolant circulation operation in which the coolant is sent to the radiator 20 is carried out in the coolant circulation circuit 1, and heat recovered by the coolant is thus released into the atmosphere by the radiator 20.

The first switching valve 60 can be switched to either an open state in which the coolant can circulate through the extraction pipe H3 (in this case, a completely open state with the extent of opening being 100%) or a closed state in which the coolant cannot circulate through the extraction pipe H3 (in this case, a completely closed state with the extent of opening being 0%). That is, the first switching valve 60 can switch states whether a supply of the coolant to the block-side water jacket 11a is made or a supply of the coolant is stopped. In other words, the first switching valve 60 can switch states whether cooling the block-side water jacket 11a is carried out or cooling is not carried out. The opening/closing operation of the first switching valve 60 is controlled by an ECU 100.

Specifically, when the engine 10 is cold with the temperature of the coolant being relatively low, the first switching valve 60 is switched to a closed state, and a supply of the coolant to the block-side water jacket 11a is stopped. Otherwise, the coolant is supplied to the head-side water jacket 12a. Accordingly, the temperature of the cylinder block 11 is promptly increased, while suppressing an excessive increase of the temperature of the cylinder head 12, and friction loss that occurs in various places inside the engine 10 is reduced within a short period of time after engine start-up, thus improving fuel economy.

On the other hand, when the temperature of the coolant is increased and reaches a predetermined switching temperature or a higher temperature, the first switching valve 60 is switched to an open state. Accordingly, the coolant is supplied to, in addition to the head-side water jacket 12a, to the block-side water jacket 11a. As a result, the cylinder block 11 and the cylinder head 12 are cooled, and thus the engine 10 is maintained at a suitable temperature.

The second switching valve 70 can be switched to either an open state in which the coolant can circulate through the discharge pipe H8 (in this case, a completely open state with the extent of opening being 100%) or a closed state in which the coolant cannot circulate through the discharge pipe H8 (in this case, a completely closed state with the extent of opening being 0%). That is, the second switching valve 70 can switch states whether a supply of the coolant to the exhaust heat recovery unit 40 is made or a supply of the coolant is stopped. In other words, the second switching valve 70 can switch states whether the exhaust heat recovery operation by the exhaust heat recovery unit 40 is carried out or the exhaust heat recovery operation is not carried out.

Specifically, when the second switching valve 70 is switched to an open state, a supply of the coolant to the exhaust heat recovery unit 40 is made, and the exhaust heat recovery operation by the exhaust heat recovery unit 40 is carried out. On the other hand, when the second switching valve 70 is switched to a closed state, a supply of the coolant to the exhaust heat recovery unit 40 is stopped, and the exhaust heat recovery operation by the exhaust heat recovery unit 40 is stopped. The opening/closing operation of the second switching valve 70 is controlled by an ECU 100. An example of the opening/closing control of the second switching valve 70 will be described below.

Next, intake and exhaust systems 13, 14 of the engine 10 will now be described briefly.

The engine 10 mixes air supplied from the intake system 13 and fuel supplied from a fuel supply system, which is not shown, in a suitable ratio, and generates power in a vehicle by supplying the air-fuel mixture to the combustion chamber and burning it. Also, the engine 10 releases exhaust gas, which is generated as the air-fuel mixture burns, into the atmosphere from the exhaust system 14.

The intake system 13 includes an intake pipe 13a. The intake pipe 13a is provided with an air cleaner 13b, a throttle body 13c, and a surge tank 13d from the upstream side to the downstream side of the flow of intake air. An intake manifold 13e is connected to the downstream end of the intake pipe 13a, and intake air is divided by the intake manifold 13e and flows into each cylinder of the engine 10. The intake path for introducing intake air into each cylinder of the engine 10 is composed of the internal space of each of these members.

The exhaust system 14 includes an exhaust manifold 14a attached to the engine 10 and an exhaust pipe 14b connected to the exhaust manifold 14a. The exhaust path for discharging exhaust gas is composed of the internal spaces of the exhaust manifold 14a and the exhaust pipe 14b.

The exhaust pipe 14b is provided with the above-described exhaust heat recovery unit 40, catalyst 14c, and muffler, which is not shown, and the like from the upstream side to the downstream side of the flow of exhaust air. Also, the exhaust pipe 14b is provided with an A/F sensor (air-fuel ratio sensor) 80 that serves as an exhaust gas sensor, an exhaust gas temperature sensor 112 that senses the temperature of the exhaust gas, and the like. The catalyst 14c is composed of a three-way catalyst that collectively converts, for example, carbon monoxide (CO), hydrocarbon (HC), and nitrogen oxide (NOx) into harmless substances. Note that the configuration of the exhaust system 14 is an example and other configurations may be adopted. For example, a configuration may also be adopted in which a so-called start catalyst (S/C) is provided further upstream in the exhaust path than the exhaust heat recovery unit 40.

The A/F sensor 80 is disposed downstream of the exhaust heat recovery unit 40 in the exhaust path, and senses the air-fuel ratio (A/F) of the exhaust gas introduced into the catalyst 14c. Here, a specific configuration of the A/F sensor 80 will now be described with reference to FIG. 2.

Figure 2:
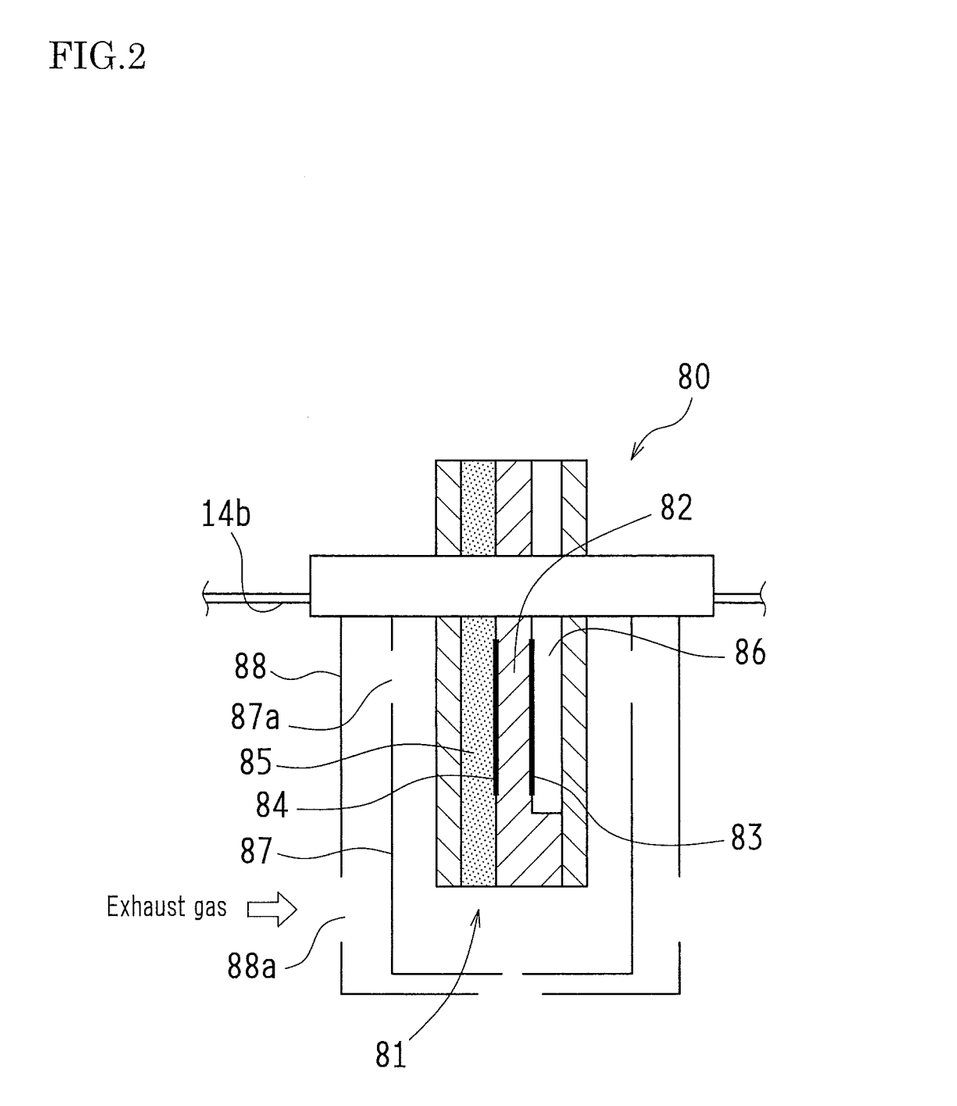
FIG. 2 is a schematic cross-sectional diagram showing an example of an A/F sensor.

The A/F sensor 80 shown in FIG. 2 is a layered sensor that outputs signals in accordance with the oxygen concentration in the exhaust gas, and includes a sensor element 81, gas-permeable covers 87, 88, and the like. The sensor element 81 is disposed inside the covers 87, 88. A large number of small pores 87a, 88a through which exhaust gas can travel are formed in the covers 87, 88, respectively.

The sensor element 81 is composed of a plate-shaped solid electrolyte layer (for example, made of zirconia) 82, an atmosphere-side electrode (for example, a platinum electrode) 83 formed on one surface of the solid electrolyte layer 82, an exhaust-side electrode (for example, a platinum electrode) 84 formed on the other surface of the solid electrolyte layer 82, a diffusion layer (for example, a porous ceramic) 85, and the like.

The atmosphere-side electrode 83 of the sensor element 81 is disposed inside an atmospheric duct 86. The inside of the atmospheric duct 86 is open to the atmosphere, and air that has flowed into the atmospheric duct 86 comes in contact with the atmosphere-side electrode 83. On the other hand, a surface of the exhaust-side electrode 84 is covered with the diffusion layer 85, and part of the exhaust gas flowing in the exhaust pipe 14b travels inside the diffusion layer 85 and comes in contact with the exhaust-side electrode 84.

With the A/F sensor 80 having such a configuration, when a predetermined voltage is applied across the atmosphere-side electrode 83 and the exhaust-side electrode 84 of the sensor element 81, an output current (sensor current) is generated in accordance with the oxygen concentration in the exhaust gas in the A/F sensor 80 due to this voltage application. Specifically, the sensor current of the A/F sensor 80 shows characteristics that the leaner the air-fuel ratio of the exhaust gas is, the greater the sensor current, and in contrast, the richer the air-fuel ratio of the exhaust gas is, the smaller the sensor current. Then, when the sensor element 81 of the A/F sensor 80 is in an activated state (state in which it is equal to or higher than the activation temperature T1, which will be described below), the sensor current of the A/F sensor 80 shows linear characteristics relative to the air-fuel ratio.

Figure 3:
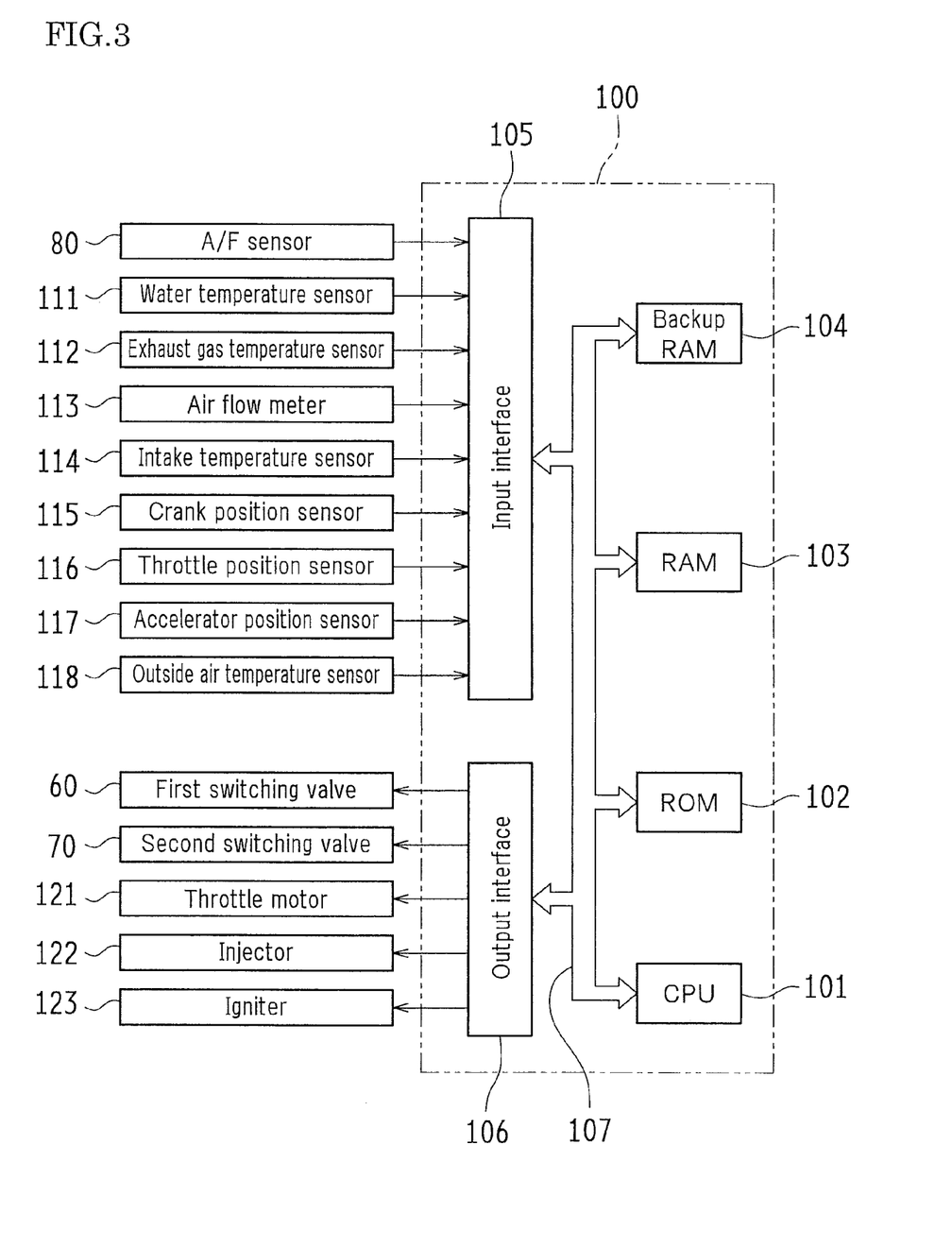
FIG. 3 is a block diagram showing an example of a control system such as an ECU.

Various types of control of the engine 10 and other members are executed by the ECU 100. As shown in FIG. 3, the ECU 100 is provided with a CPU 101, a ROM 102, a RAM 103, a backup RAM 104, an input interface 105, an output interface 106, and the like.

In the ROM 102, various control programs, maps that are referred to when executing such various control programs, and the like are stored. The CPU 101 executes computational processes based on the various control programs and maps stored in the ROM 102. The RAM 103 is a memory that temporarily stores data resulting from computation with the CPU 101 or data that has been input from various sensors and the like. The backup RAM 104 is a nonvolatile memory that stores data or the like to be saved when the engine 10 is stopped. This CPU 101, ROM 102, RAM 103, and backup RAM 104 are connected to each other via a bus 107, and are also connected to the input interface 105 and the output interface 106 via the bus 107.

The input interface 105 is connected to the A/F sensor 80, a water temperature sensor 111, an exhaust temperature sensor 112, an air flow meter 113, an intake temperature sensor 114, a crank position sensor 115, a throttle position sensor 116, an accelerator position sensor 117, an outside air temperature sensor 118, and like various sensors. The outside air temperature sensor 118 senses the temperature of outside air, and is disposed in a vehicle in a place not affected by heat sources such as the engine 10 and the exhaust system 14.

The output interface 106 is connected to the first and second switching valves 60, 70, a throttle motor 121 that drives a throttle valve (not shown) attached to the throttle body 13c, injectors 122 that inject fuel into the cylinders of the engine 10, an igniter 123 that adjusts the ignition timing of spark plugs (not shown) attached to the cylinder head 12, and the like.

The ECU 100 executes various types of control of the engine 10 based on the output of the aforementioned various sensors. For example, the ECU 100 executes air-fuel ratio feedback control based on the output of the A/F sensor 80. The air-fuel ratio feedback control is to control the injection amount of fuel injected from the injectors 122 into the intake path or the like such that the actual air-fuel ratio of the exhaust gas obtained from the output of the A/F sensor 80 matches the target air-fuel ratio (for example, the theoretical air-fuel ratio). Also, the ECU 100 executes the opening/closing control of the first and second switching valves 60, 70 to carry out switching control on the circulation path of the coolant in the coolant circulation circuit 1. Then, the ECU 100 executes the opening/closing control of the second switching valve 70 to carry out flow rate limiting control on the coolant flowing into the exhaust heat recovery unit 40, which will be described below.

Figure 4:
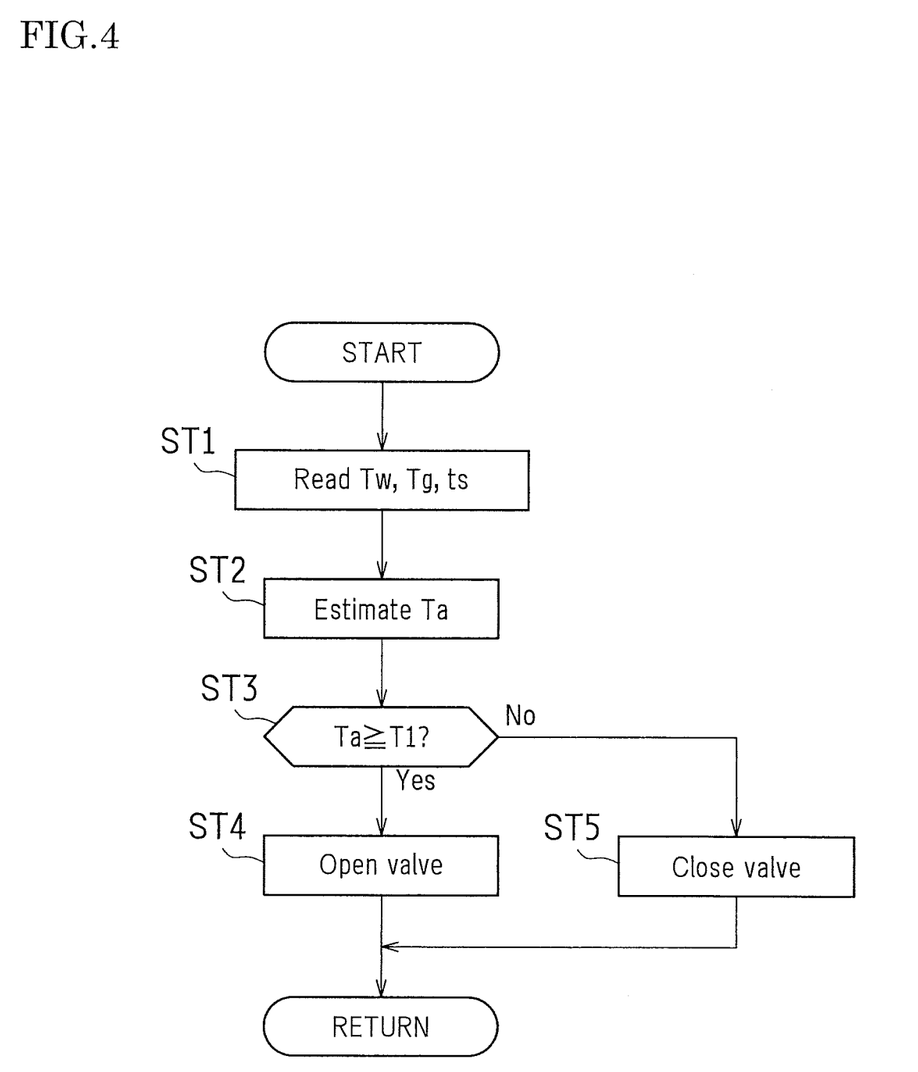
FIG. 4 is a flowchart showing an example of flow rate limiting control executed by an ECU on a coolant that flows into an exhaust heat recovery unit.

In this embodiment, a flow rate limiting means is provided that limits the flow rate of the coolant circulating in the exhaust heat recovery unit 40 in the case where a temperature Ta of the sensor element 81 of the A/F sensor 80 is below a predetermined activation temperature T1. In more detail, the extent of opening of the second switching valve 70, which is the aforementioned flow rate limiting means, is made smaller in the case where the temperature Ta of the sensor element 81 of the A/F sensor 80 is below the predetermined activation temperature T1 than in the case where the temperature Ta is equal to or higher than the activation temperature T1. Accordingly, the temperature of the sensor element 81 of the A/F sensor 80 is promptly increased by limiting the exhaust heat recovery operation performed by the exhaust heat recovery unit 40 to reach the activation temperature T1. An example of this flow rate limiting control on the coolant flowing into the exhaust heat recovery unit 40 will now be described with reference to the flowchart of FIG. 4. After the engine 10 is started, the procedure shown in the flowchart of FIG. 4 is carried out, for example, every few milliseconds or every predetermined crankshaft rotation angle.

First, in step ST1, the ECU 100 reads parameters for A/F sensor 80 temperature estimation, and next, in step ST2, estimates the temperature (element temperature) Ta of the sensor element 81 of the A/F sensor 80 based on the parameters read in step ST1.

In step ST1, for example, a temperature Tw of the coolant, a temperature Tg of the exhaust gas, and a vehicle at-rest time ts are read as parameters for A/F sensor 80 temperature estimation. The temperature Tw of the coolant is read from the output signal of the water temperature sensor 111. The temperature Tg of the exhaust gas is read from the output signal of the exhaust temperature sensor 112. The vehicle at-rest time ts is the time elapsed after a vehicle comes to a stop until it starts moving, and is measured by a timer of the ECU 100. Note that the at-rest time of the engine 10 may be used in place of the vehicle at-rest time ts.

A temperature estimation map to estimate the temperature Ta of the sensor element 81 of the A/F sensor 80 is preemptively stored in the ROM 102 of the ECU 100. This temperature estimation map indicates a relationship, which has been mapped in advance through experimentation, simulation, or the like, between the temperature Ta of the sensor element 81 of the A/F sensor 80 and the parameters for A/F sensor 80 temperature estimation (herein, the temperature Tw of the coolant, the temperature Tg of the exhaust gas, and the vehicle at-rest time ts). In step ST2, the temperature Ta of the sensor element 81 of the A/F sensor 80 is estimated based on the parameters read in step ST1 (the temperature Tw of the coolant, the temperature Tg of the exhaust gas, and the vehicle at-rest time ts) with reference to the aforementioned temperature estimation map. For example, the temperature Ta of the sensor element 81 of the A/F sensor 80 is estimated so as to be a greater value in the case where the temperature Tw of the coolant is high than in the case where the temperature Tw is low. Also, the temperature Ta of the sensor element 81 of the A/F sensor 80 is estimated so as to be a greater value in the case where the temperature Tg of the exhaust gas is high than in the case where the temperature Tg is low. Also, the temperature Ta of the sensor element 81 of the A/F sensor 80 is estimated so as to be a greater value in the case where the vehicle at-rest time ts is short than in the case where the vehicle at-rest time ts is long.

Next, in step ST3, the ECU 100 judges whether the temperature Ta of the sensor element 81 of the A/F sensor 80 estimated in step ST2 is equal to or higher than the activation temperature T1 that has been set in advance. The activation temperature T1 is a temperature at which the sensor element 81 of the A/F sensor 80 is sufficiently heated and activated, and specifically, it is set to be a temperature such that the A/F sensor 80 stably outputs a sensor current that is in accordance with the oxygen concentration in the exhaust gas.

In the case of YES in step ST3, or that is, in the case where it is judged that the temperature Ta of the sensor element 81 of the A/F sensor 80 is equal to or higher than the activation temperature T1, the procedure advances to step ST4. On the other hand, in the case of NO in step ST3, or that is, in the case where it is judged that the temperature Ta of the sensor element 81 of the A/F sensor 80 is lower than the activation temperature T1, the procedure advances to step ST5.

Then, in step ST4, the ECU 100 shifts the second switching valve 70 to an open state. Accordingly, the coolant is supplied from the water pump 30 to the exhaust heat recovery unit 40, and the exhaust heat recovery operation by the exhaust heat recovery unit 40 is carried out.

On the other hand, in step ST5, the ECU 100 shifts the second switching valve 70 to a closed state. Accordingly, a supply of the coolant from the water pump 30 to the exhaust heat recovery unit 40 is limited, and the exhaust heat recovery operation by the exhaust heat recovery unit 40 is limited. In this case, a supply of the coolant to the exhaust heat recovery unit 40 is stopped, and the exhaust heat recovery operation by the exhaust heat recovery unit 40 is stopped.

In this embodiment, as described above, in the case where the temperature Ta of the sensor element 81 of the A/F sensor 80 is below the activation temperature T1, the flow rate of the coolant that circulates in the exhaust heat recovery unit 40 is limited, and the exhaust heat recovery operation by the exhaust heat recovery unit 40 is limited. In accordance with the flow rate limiting control of the coolant in such an exhaust heat recovery unit 40, in the exhaust heat recovery unit 40, heat exchange between the exhaust gas that flows in the exhaust path of the engine 10 and the coolant that flows into the exhaust heat recovery unit 40 from the introduction pipe H7 is limited, and thus a decrease of the temperature of the exhaust gas resulting from the exhaust heat recovery operation in the exhaust heat recovery unit 40 is suppressed. This makes it possible to promptly activate the A/F sensor 80 provided downstream of the exhaust heat recovery unit 40 in the exhaust path. That is, it is possible to promptly raise the temperature of the sensor element 81 of the A/F sensor 80 to reach the activation temperature T1. In this embodiment, since a supply of the coolant to the exhaust heat recovery unit 40 is stopped, a decrease of the temperature of the exhaust gas resulting from the exhaust heat recovery operation in the exhaust heat recovery unit 40 is suppressed, thus making it possible to facilitate the activation of the A/F sensor 80. Then, it is possible to carry out air-fuel ratio feedback control that is based on the output of the A/F sensor 80 soon after engine 10 start-up.

The above-described limitation on the flow rate of the coolant flowing into the exhaust heat recovery unit 40 is lifted when the temperature Ta of the sensor element 81 of the A/F sensor 80 becomes equal to or higher than the activation temperature T1. Accordingly, the coolant is supplied to the exhaust heat recovery unit 40 from the water pump 30, and the exhaust heat recovery operation by the exhaust heat recovery unit 40 is carried out. Here, since the exhaust heat recovery unit 40 is disposed in the bypass path that bypasses the engine 10, cooling (or warm-up) of the engine 10 and the exhaust heat recovery operation by the exhaust heat recovery unit 40 can be carried out independently.

For example, even when limitation on the flow rate of the coolant into the exhaust heat recovery unit 40 is lifted, it is possible to continuously limit the flow rate of the coolant into the block-side water jacket 11a of the engine 10, and it is possible to facilitate warm-up of the cylinder block 11 while carrying out the exhaust heat recovery operation by the exhaust heat recovery unit 40.

–Other embodiments–

The present invention is not limited only to the above-described embodiment, and all modifications and applications encompassed within the scope of the claims and a range of equivalency therewith are possible.

(1) The above-described coolant circulation circuit 1 is an example and can be variously modified as long as it is configured such that the flow rate of the coolant that circulates in the exhaust heat recovery unit 40 can be limited.

For example, the coolant circulation circuit 1 may be configured so as to be provided with apparatuses other than the radiator 20, the water pump 30, and the exhaust heat recovery unit 40.

In the foregoing embodiment, the first switching valve 60 is disposed in the extraction pipe H3 connected downstream of the block-side water jacket 11a, but the first switching valve 60 may be disposed upstream of the block-side water jacket 11a.

As the first switching valve 60, a thermostat that has the same configuration as the thermostat 50 of the foregoing embodiment may be used. Also, as the first switching valve 60, a flow rate regulating valve that regulates, in accordance with the extent of opening of the valve, the flow rate of the coolant that circulates in the block-side water jacket 11a. Note that, in the foregoing embodiment, a supply of the coolant to the block-side water jacket 11a is stopped when the engine 10 is cold, i.e., when the temperature of the coolant is relatively low, but it is also possible to make the flow rate of the coolant supplied to the block-side water jacket 11a small by reducing the extent of opening of the first switching valve 60.

Also, in the foregoing embodiment, the second switching valve 70 is disposed in the discharge pipe H8, but the second switching valve 70 may be disposed in the introduction pipe H7.

As the second switching valve 70, a flow rate regulating valve that regulates, in accordance with the extent of opening of the valve, the flow rate of the coolant that circulates in the exhaust heat recovery unit 40. In this case, it is preferable that in the case where the temperature Ta of the sensor element 81 of the A/F sensor 80 is below the activation temperature T1, the extent of opening of the second switching valve 70 is made smaller than in the case where the temperature Ta is equal to or higher than the activation temperature T1. Note that, in this case, it is possible to set the extent of opening of the second switching valve 70 according to the difference between the temperature Ta of the sensor element 81 of the A/F sensor 80 and the activation temperature T1. Furthermore, it is also possible that the larger the difference between the temperature Ta of the sensor element 81 of the A/F sensor 80 and the activation temperature T1, the smaller the extent of opening of the second switching valve 70.

Also, in the foregoing embodiment, the exhaust heat recovery unit 40 is disposed on the bypass path that bypasses the block-side water jacket 11a and the head-side water jacket 12a, but the exhaust heat recovery unit 40 may be disposed elsewhere. For example, a configuration may be possible in which the exhaust heat recovery unit 40 is disposed downstream of the block-side water jacket 11a or downstream of the head-side water jacket 12a.

Also, in the foregoing embodiment, the coolant discharged from the water pump 30 is supplied to both the block-side water jacket 11a and the head-side water jacket 12a. However, the present invention is not limited to this configuration, and the coolant discharged from the water pump 30 may be supplied to the head-side water jacket 12a after being circulated in the block-side water jacket 11a.

(2) In the foregoing embodiment, an example of the flow rate limiting means is the second switching valve 70. However, the present invention is not limited to this configuration, and the flow rate limiting means can be a water pump capable of regulating the flow rate of the coolant that circulates in the exhaust heat recovery unit 40. In this case, it is preferable that in the case where the temperature Ta of the sensor element 81 of the A/F sensor 80 is below the activation temperature T1, the discharge amount of the water pump is made smaller than in the case where the temperature Ta is equal to or higher than the activation temperature T1.

For example, it is possible to use an electrically-operated water pump or a clutch-operated water pump as the flow rate limiting means. A configuration in the case of a clutch-operated water pump may be such that a clutch mechanism is interposed between the drive shaft of the water pump and the crankshaft, and with the engine being in a driving state, the water pump is driven when the clutch mechanism is in an engaged state, and the water pump is stopped when the clutch mechanism is in a released state.

(3) The temperature estimation map for the sensor element 81 of the A/F sensor 80 described in the foregoing embodiment is an example, and the temperature Ta of the sensor element 81 of the A/F sensor 80 may be estimated using other parameters. For example, the temperature Ta of the sensor element 81 of the A/F sensor 80 may be estimated based on the temperature Tw of the coolant and the temperature Tg of the exhaust gas.

It is also possible to use parameters other than the above-described temperature Tw of the coolant, temperature Tg of the exhaust gas, and vehicle at-rest time ts. For example, in cold weather regions, not only during the start-up of the engine 10, but also during vehicle traveling, the temperature Ta of the sensor element 81 of the A/F sensor 80 may fall below the activation temperature T1. In such a case, it is effective to use, in addition to the aforementioned temperature Tw of the coolant and temperature Tg of the exhaust gas, the outside air temperature sensed by the outside air temperature sensor 118, as parameters to estimate the temperature Ta of the sensor element 81 of the A/F sensor 80. In this case, the temperature Ta of the sensor element 81 of the A/F sensor 80 is estimated to be a larger value when the outside air temperature is high than when the outside air temperature is low.

(4) In the foregoing embodiment, a layered exhaust gas sensor (A/F sensor 80) is used as an example. However, the present invention is not limited thereto, and an exhaust gas sensor having a different structure may be used. For example, it is also possible to use a cup-shaped exhaust gas sensor (A/F sensor 90) as shown in FIG. 5.

Figure 5:
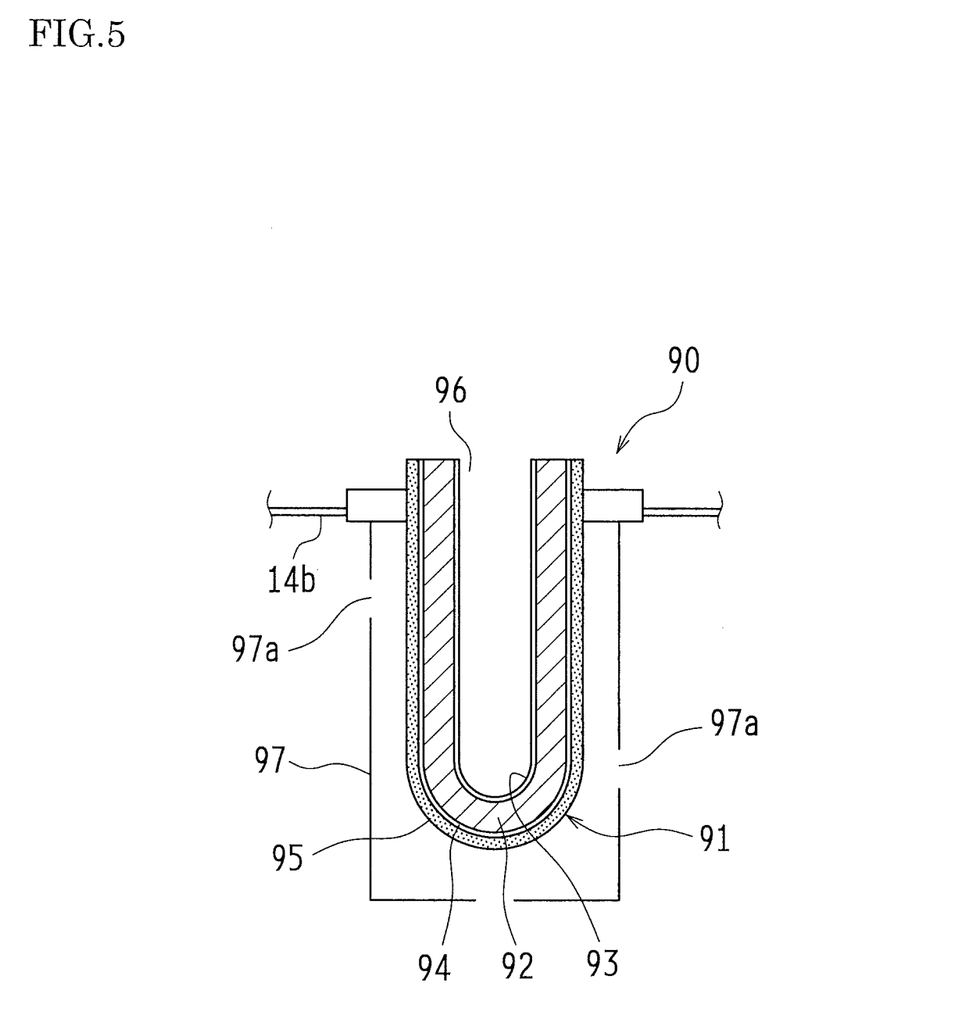
FIG. 5 is a schematic cross-sectional diagram showing another example of an A/F sensor.

The A/F sensor 90 shown in FIG. 5 is provided with a sensor element 91, an gas-permeable cover 97, and the like. The sensor element 91 is disposed inside the cover 97. Small pores 97a through which the exhaust gas can pass are formed in the cover 97.

The sensor element 91 has a tubular (cup-shaped) structure with one end being closed. The sensor element 91 is composed of a solid electrolyte layer (for example, made of zirconia) 92, an atmosphere-side electrode (for example, a platinum electrode) 93 formed on the inner surface of the solid electrolyte layer 92, an exhaust-side electrode (for example, a platinum electrode) 94 formed on the outside surface of the solid electrolyte layer 92, a porous protective layer (for example, a porous ceramic) 95, and the like.

Inside the sensor element 91, an atmospheric chamber 96 that is open to the atmosphere is formed. Atmospheric air that has flowed into this atmospheric chamber 96 comes in contact with the atmosphere-side electrode 93. On the other hand, a surface of the exhaust-side electrode 94 is covered with the porous protective layer 95, and some of the exhaust gas flowing in the exhaust pipe 14b travels through the porous protective layer 95 and comes in contact with the exhaust-side electrode 94.

As with the layered A/F sensor 80 shown in FIG. 2, the cup-shaped A/F sensor 90 shown in FIG. 5 also outputs signals in accordance with the oxygen concentration in the exhaust gas. Specifically, the A/F sensor 90 outputs signals that are increased when the air-fuel ratio of the exhaust gas is leaner and, in contrast, decreased when the air-fuel ratio of the exhaust gas is richer. Then, when the sensor element 91 of the A/F sensor 90 is in an activated state (state in which it is equal to or higher than the activation temperature), the sensor current of the A/F sensor 90 shows linear characteristics relative to the air-fuel ratio.

(5) Also, in the foregoing embodiment, an example of the exhaust gas sensor is the A/F sensor 80, but an $O_2$ sensor may be used as the exhaust gas sensor. In the case of an $O_2$ sensor, when the sensor element is in an activated state (state in which the temperature is equal to or higher than the activation temperature), the sensor current exhibits characteristics of changing in a stepwise manner in the vicinity of the theoretical air-fuel ratio.

INDUSTRIAL APPLICABILITY

The present invention is an engine cooling device including a water pump, a radiator, an exhaust heat recovery unit, and a coolant circulation circuit for circulating a coolant in these apparatuses, and is applicable to a device in which an exhaust gas sensor is disposed downstream of the exhaust heat recovery unit in the exhaust path.

REFERENCE SIGNS LIST

1 Coolant circulation circuit
10 Engine
11 Cylinder block
11a Block-side water jacket
12 Cylinder head
12a Head-side water jacket
20 Radiator
30 Water pump
40 Exhaust heat recovery unit
70 Second switching valve (flow rate limiting means)
80 A/F sensor (exhaust gas sensor)

The invention claimed is:

1. An engine cooling system comprising a water pump, a radiator, an exhaust heat recovery unit, and a coolant circulation circuit for circulating a coolant in these apparatuses,
wherein coolant paths are each provided inside a cylinder block and a cylinder head of the engine and the coolant paths are disposed in parallel,
wherein the exhaust heat recovery unit is disposed in a bypass path that bypasses the coolant paths provided inside the engine,
wherein the engine cooling system further includes: a first switching valve that limits a flow rate of the coolant flowing into the coolant path of the cylinder block; and a second switching valve that limits a flow rate of the coolant circulating in the exhaust heat recovery unit,
wherein an extent of opening of the second switching valve is made small in a case where a temperature of a sensor element of an exhaust gas sensor is below a preset activation temperature compared with when the temperature of the sensor element of the exhaust gas sensor is equal to or higher than the preset activation temperature, the exhaust gas sensor outputting signals in accordance with an oxygen concentration in an exhaust gas, and being disposed downstream of the exhaust heat recovery unit in an exhaust path,
wherein an extent of opening of the first switching valve is made small when the engine is cold compared with when the engine is not cold, and
wherein the temperature of the sensor element of the exhaust gas sensor is estimated based on at least a temperature of the coolant and a temperature of the exhaust gas which is sensed by an additional exhaust gas sensor.

2. The engine cooling system according to claim 1, wherein a supply of the coolant to the coolant path of the cylinder block is stopped by the first switching valve when the engine is cold.

3. The engine cooling system according to claim 1, wherein a supply of the coolant to the exhaust heat recovery unit is stopped by the second switching valve in a case where the temperature of the sensor element is below the activation temperature.

4. An engine cooling system comprising a water pump, a radiator, an exhaust heat recovery unit, and a coolant circulation circuit for circulating a coolant in these apparatuses,
the engine cooling system comprising a flow rate limiting means that limits a flow rate of the coolant circulating in the exhaust heat recovery unit in a case where a temperature of a sensor element of an exhaust gas sensor is below a preset activation temperature, the exhaust gas sensor outputting signals in accordance with an oxygen concentration in an exhaust gas, and being disposed downstream of the exhaust heat recovery unit in an exhaust path,
wherein the temperature of the sensor element of the exhaust gas sensor is estimated based on at least a temperature of the coolant and a temperature of the exhaust gas which is sensed by an additional exhaust gas sensor.

* * * * *